(12) United States Patent
Nishio

(10) Patent No.: US 9,240,665 B2
(45) Date of Patent: Jan. 19, 2016

(54) GAS LASER APPARATUS CARRYING OUT IMPROVED STARTUP PROCESS

(71) Applicant: FANUC CORPORATION, Minamitsuru-gun, Yamanashi (JP)

(72) Inventor: Akihiko Nishio, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/626,155

(22) Filed: Feb. 19, 2015

(65) Prior Publication Data

US 2015/0236469 A1 Aug. 20, 2015

(30) Foreign Application Priority Data

Feb. 20, 2014 (JP) ................................ 2014-030973

(51) Int. Cl.
*H01S 3/22* (2006.01)
*H01S 3/036* (2006.01)
*H01S 3/00* (2006.01)

(52) U.S. Cl.
CPC ............... *H01S 3/036* (2013.01); *H01S 3/0014* (2013.01)

(58) Field of Classification Search
USPC .................................. 372/55–58, 61
See application file for complete search history.

(56) References Cited

U.S. PATENT DOCUMENTS

| 7,209,507 | B2* | 4/2007 | Rule et al. | 372/58 |
| 8,576,891 | B2 | 11/2013 | Miyamoto | |
| 2001/0022797 | A1* | 9/2001 | Hongu et al. | 372/55 |

FOREIGN PATENT DOCUMENTS

| JP | 63133585 | 6/1988 |
| JP | 02023686 | 1/1990 |
| JP | 02-065187 | 3/1990 |
| JP | 02130981 | 5/1990 |
| JP | 2561510 | 1/1998 |
| JP | 2004095425 | 3/2004 |
| JP | 2014165189 | 9/2014 |
| WO | 2012053298 | 4/2012 |

\* cited by examiner

*Primary Examiner* — Dung Nguyen
(74) *Attorney, Agent, or Firm* — RatnerPrestia

(57) ABSTRACT

A gas laser apparatus includes a receptacle for enclosing a laser gas, a laser oscillator that emits a laser beam, a pressure detecting unit that detects gas pressure inside the receptacle, an exhausting unit that discharges a gas from the receptacle, a feeding unit that supplies a laser gas into the receptacle, a pressure storing unit configured to store the pressure detected by the pressure detecting unit and retain stored information even when a power supply is shut off, a comparing unit that compares pressure inside the receptacle when the gas laser apparatus has stopped suddenly with pressure inside the receptacle when the gas laser apparatus is restarted thereafter, and a determining unit that determines whether or not a gas should be discharged from the receptacle and whether or not the laser gas should be supplied into the receptacle based on the result of the comparison.

7 Claims, 7 Drawing Sheets

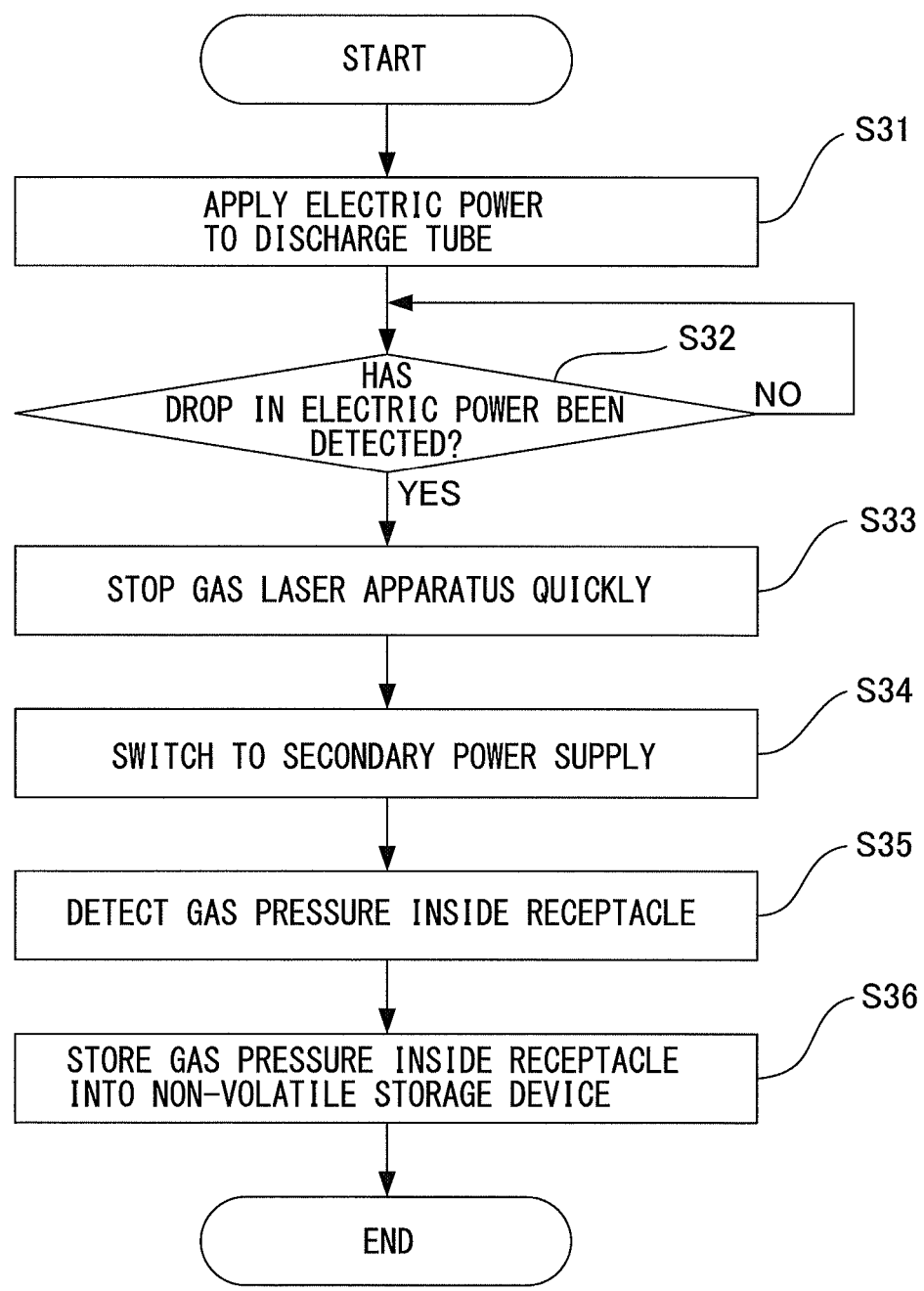

GAS LASER APPARATUS CARRYING OUT IMPROVED STARTUP PROCESS

BACKGROUND OF THE INVENTION

1. Field of the Invention

The present invention relates to gas laser apparatuses.

2. Description of the Related Art

Output efficiency of a gas laser apparatus decreases in accordance with a decrease in the purity of a laser gas enclosed in a receptacle. Although a receptacle of a gas laser apparatus is designed so as to be sealed substantially hermetically, a surrounding atmospheric gas may enter the receptacle in some cases. Therefore, a laser gas is replaced by discharging a gas from the receptacle to the outside and by refilling the receptacle with a laser gas, in order to increase the purity of a laser gas.

Japanese Laid-open Patent Publication No. 02-65187 discloses a laser gas replacing method in which a laser gas in a container is replaced periodically. According to this laser gas replacing method, the laser gas is exhausted from the container until the pressure inside the container reaches a predetermined pressure, and the exhausting process is terminated after the exhausting process is continued for a predetermined period of time.

Japanese Registered Utility Model No. 2561510 discloses a gas laser apparatus that includes a gas leak detecting device. The gas leak detecting device is configured to detect a gas leak during the time when the gas laser apparatus is stopped. Specifically, the gas leak detecting device disclosed in Japanese Registered Utility Model No. 2561510 stores the pressure of a laser gas prior to the power supply being turned off, and compares the pressure of a laser gas when the power supply is turned on again with the stored pressure of the laser gas. The gas leak detecting device then detects an occurrence of a gas leak on the basis of the result of the comparison.

With the laser gas replacing method disclosed in Japanese Laid-open Patent Publication No. 02-65187, however, the laser gas is replaced at a fixed cycle, and thus the laser gas is replaced even when the laser gas does not need to be replaced. Therefore, the amount of consumed laser gas increases, and the running cost of the gas laser apparatus increases. In addition, the gas laser apparatus needs to be put on standby until the replacement of a laser gas is completed, and thus the startup time of the gas laser apparatus tends to become longer. Furthermore, with the gas laser apparatus disclosed in Japanese Registered Utility Model No. 2561510, efficiency of the startup process of the gas laser apparatus is not taken into consideration.

Accordingly, there is a need for a gas laser apparatus in which a laser gas can be replaced as necessary, making it possible to reduce the startup time and to reduce the amount of consumed laser gas.

SUMMARY OF THE INVENTION

According to a first aspect of the invention of the present application, a gas laser apparatus comprising: a receptacle in which a laser gas is enclosed; a laser oscillator configured to emit a laser beam with a laser gas serving as an excitation medium; a pressure detecting unit configured to detect pressure of a gas inside the receptacle; an exhausting unit configured to discharge a gas from the receptacle; a feeding unit configured to supply a laser gas into the receptacle; a pressure storing unit configured to store the pressure detected by the pressure detecting unit and retain stored information even when a power supply is shut off; a comparing unit configured to compare pressure of a gas inside the receptacle which is obtained when the gas laser apparatus has stopped suddenly and is stored by the pressure storing unit, with pressure of a gas inside the receptacle which is detected by the pressure detecting unit and obtained when the gas laser apparatus is restarted after a sudden stoppage; and a determining unit configured to determine whether or not a gas should be discharged from the receptacle and whether or not the laser gas should be supplied into the receptacle based on a result of a comparison by the comparing unit, is provided.

According to a second aspect of the invention of the present application, in the gas laser apparatus according to the first aspect of the invention, the determining unit is configured to determine how an exhausting process of discharging a gas from the receptacle is carried out based on the result of a comparison by the comparing unit.

According to a third aspect of the invention of the present application, in the gas laser apparatus according to the second aspect of the invention, the determining unit is configured to determine at least one of a target pressure value of a laser gas inside the receptacle in the exhausting process, the number of exhaust operations to be carried out, and duration of an exhaust operation.

According to a fourth aspect of the invention of the present application, in the gas laser apparatus according to any one of the first to third aspects of the invention, the pressure storing unit is configured to periodically store pressure of a gas inside the receptacle.

According to a fifth aspect of the invention of the present application, the gas laser apparatus according to any one of the first to third aspects of the invention further comprises a secondary power supply device configured to supply back-up electric power to the pressure detecting unit when main electric power supplied to the gas laser apparatus is shut off, wherein the pressure detecting unit is configured to detect pressure of a gas inside the receptacle immediately after the main electric power is shut off.

According to a sixth aspect of the invention of the present application, the gas laser apparatus according to the fifth aspect of the invention further comprises an electric power drop detector configured to detect a drop in the main electric power, wherein the electric power drop detector is configured to detect that the main electric power has been shut off on the basis of at least one of electric power, an electric current, and a voltage supplied to the gas laser apparatus.

According to a seventh aspect of the invention of the present application, in the gas laser apparatus according to the sixth aspect of the invention, the pressure storing unit is configured to store pressure of a gas inside the receptacle detected by the pressure detecting unit immediately after the electric power drop detector detects that the main electric power has been shut off.

These and other objects, features, and advantages of the present invention will become more apparent in light of the detailed description of exemplary embodiments there as illustrated in the accompanying drawings.

BRIEF DESCRIPTION OF THE DRAWINGS

FIG. 7 is a flowchart illustrating a flow of a process performed when a gas pressure at the time of a sudden stoppage is obtained in the gas laser apparatus according to the second embodiment.

DETAILED DESCRIPTION OF THE INVENTION

Hereinafter, embodiments of the present invention will be described with reference to the accompanying drawings. The scale of illustrated constituent elements of the embodiments is modified as necessary for better understanding of the present invention.

Figure 1:
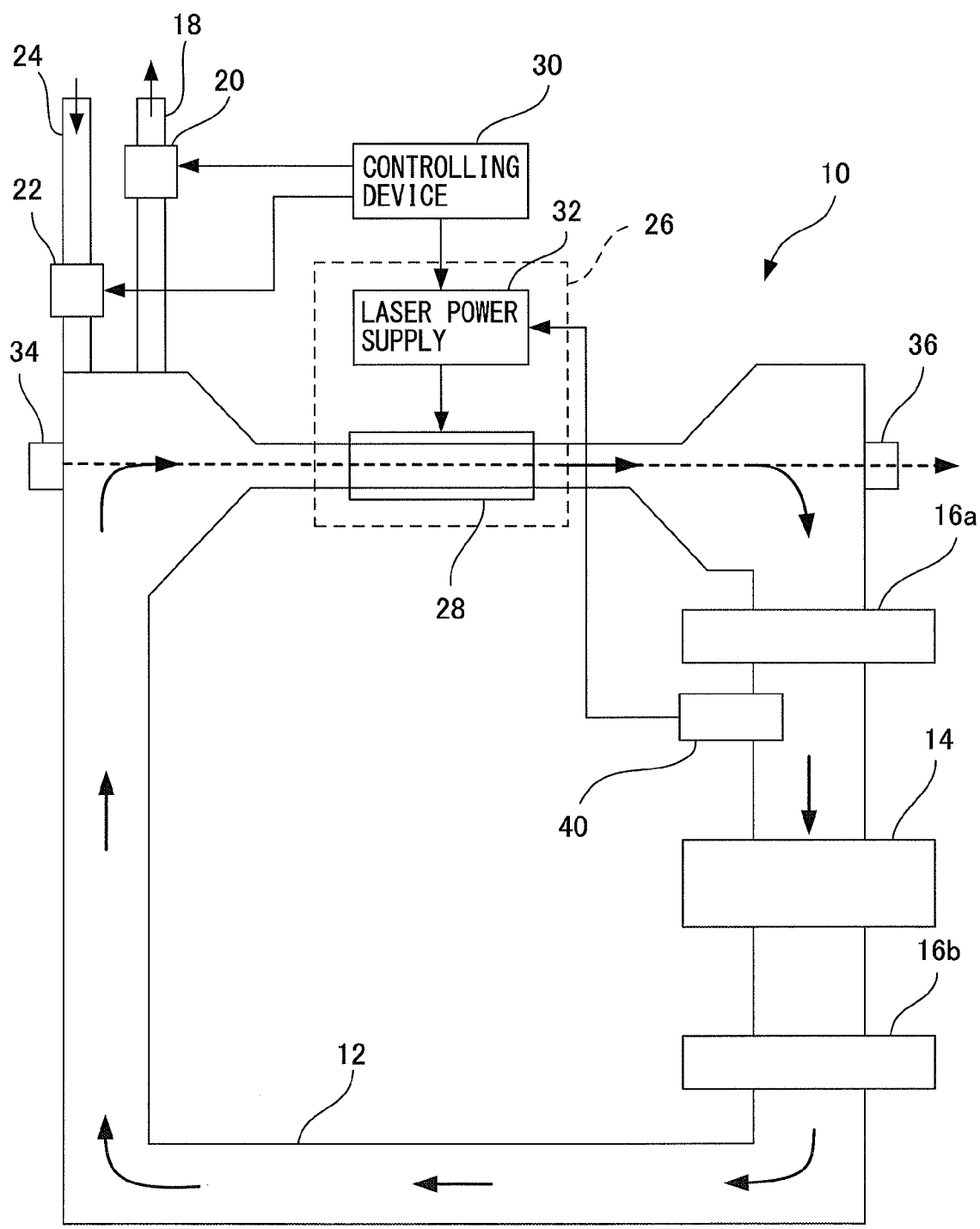
FIG. 1 illustrates a configuration of a gas laser apparatus according to a first embodiment.

FIG. 1 illustrates a configuration of a gas laser apparatus 10 according to a first embodiment. The gas laser apparatus 10 is a laser oscillator apparatus that generates a laser beam with a laser gas serving as an excitation medium, such as a gas containing carbon dioxide as a primary component. A laser beam generated by the gas laser apparatus 10 is used for processing a work, as in cutting, boring, welding, and so forth.

The gas laser apparatus 10 according to the present embodiment includes a receptacle 12 that is sealed substantially hermetically so that the laser gas is enclosed in its interior space. As illustrated in FIG. 1, the receptacle 12 forms a circulation path on which the laser gas can be circulated. A fan 14 and heat exchangers 16a and 16b are provided on the circulation path. The fan 14 has a function of circulating the laser gas inside the receptacle 12. A cooling medium, such as water, circulates through the heat exchangers 16a and 16b. The heat exchangers 16a and 16b have a function of cooling the laser gas by exchanging heat between the cooling medium and the laser gas circulating inside the receptacle 12. In FIG. 1, a moving path of the laser gas is indicated by solid arrows.

The receptacle 12 of the gas laser apparatus 10 is connected to an exhaust device 20 through an exhaust pipe 18. The exhaust device 20 includes a negative pressure generator, such as a vacuum pump, and has a function of discharging a gas from the receptacle 12 to an external system. In addition, a feed device 22 is connected to the receptacle 12 through a feed pipe 24, in order to have a function of supplying a laser gas contained in a laser gas tank (not illustrated) into the receptacle 12.

The gas laser apparatus 10 includes an excitation device 26 that excites a laser gas, and a controlling device 30 that controls the gas laser apparatus 10. The controlling device 30 controls electric power to be applied to the excitation device 26. The controlling device 30 cooperates with a pressure sensor 40, which will be described below, so as to obtain a pressure state inside the receptacle 12 and controls the exhaust device 20 and the feed device 22, depending on the obtained pressure state. The controlling device 30 has a hardware configuration including a ROM that stores a control program, a CPU that executes various calculation processes, a RAM that temporarily stores a result of calculation by the CPU, a non-volatile storage device, and the like.

The excitation device 26 includes a discharge tube 28 provided with a pair of electrodes and a laser power supply 32 that supplies electric power to the discharge tube 28. In the discharge tube 28, an electric discharge occurs between the electrodes when high frequency electric power is applied from the laser power supply 32, to excite the laser gas in the receptacle 12. Although a single discharge tube 28 is illustrated in FIG. 1, a plurality of discharge tubes 28 may be used. A laser beam generated from the laser gas that has been excited by the discharge tube 28 is amplified between a rear mirror 34 and an output mirror 36, which have partial transmittance properties, and then emitted to the outside through the output mirror 36. The dashed line illustrated inside the receptacle 12 in FIG. 1 indicates a path of the laser beam to be emitted through the output mirror 36.

It has been known that the output efficiency of a laser beam depends on the purity of a laser gas. Therefore, the gas laser apparatus 10 according to the present embodiment includes the pressure sensor 40 for monitoring the purity of the laser gas inside the receptacle 12. When a surrounding atmospheric gas is mixed into the laser gas inside the receptacle 12, for example, the pressure inside the receptacle 12 increases due to the pressure of the gas that has entered the receptacle 12. Therefore, by monitoring the pressure of the gas inside the receptacle 12, a change in the purity of the laser gas can be detected indirectly.

Figure 2:
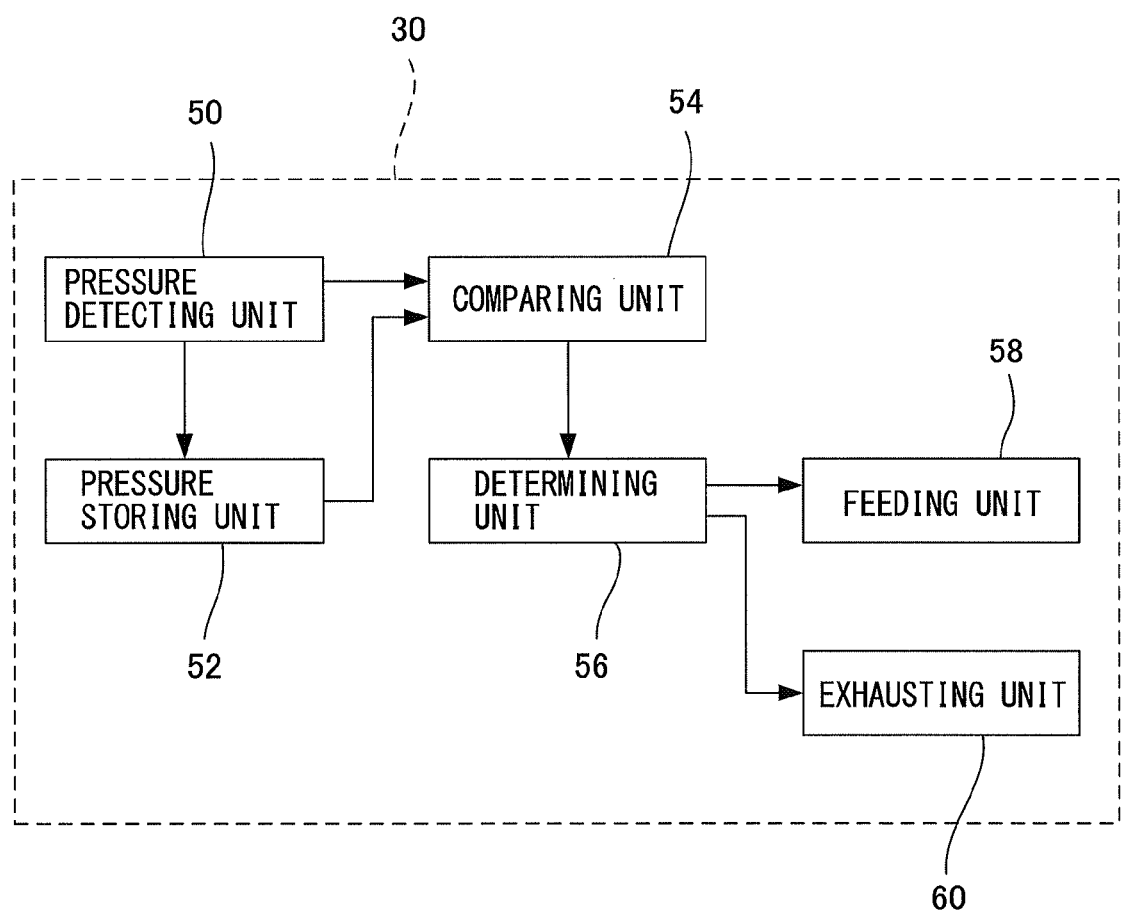
FIG. 2 is a functional block diagram of a controlling device of the gas laser apparatus illustrated in FIG. 1.

FIG. 2 is a functional block diagram of the controlling device 30 of the gas laser apparatus 10 according to the present embodiment. The controlling device 30 includes a pressure detecting unit 50, a pressure storing unit 52, a comparing unit 54, a determining unit 56, a feeding unit 58, and an exhausting unit 60.

The pressure detecting unit 50 has a function of detecting the pressure of the gas inside the receptacle 12 in cooperation with the pressure sensor 40 (refer to FIG. 1). A pressure value obtained by the pressure detecting unit 50 is output to the pressure storing unit 52 and to the comparing unit 54.

The pressure storing unit 52 has a function of storing the pressure value obtained by the pressure detecting unit 50 in cooperation with the non-volatile storage device of the controlling device 30. Therefore, the pressure value stored by the pressure storing unit 52 is retained even when the electric power supplied to the gas laser apparatus 10 is shut off. For example, the non-volatile storage device may include, but is not limited to, a flash memory or an SRAM having a built-in battery.

The comparing unit 54 has a function of comparing a pressure value stored in the pressure storing unit 52 with a pressure value obtained by the pressure detecting unit 50. The comparing unit 54, for example, subtracts the pressure value stored in the pressure storing unit 52 from the pressure value obtained by the pressure detecting unit 50 and outputs a pressure difference obtained as a result of the subtraction, to the determining unit 56.

The determining unit 56 has a function of determining whether or not the gas should be discharged from the receptacle 12 to the outside and determining whether or not a laser gas should be supplied into the receptacle 12, depending on the result of a comparison by the comparing unit 54. The determining unit 56, for example, compares a pressure difference calculated by the comparing unit 54 with a predetermined threshold value. When the pressure difference is greater than the threshold value, the determining unit 56 then determines that the laser gas needs to be replaced, and an exhausting process is executed accordingly. On the other hand, when the pressure difference is less than the threshold value, the determining unit 56 determines that the laser gas does not need to be replaced.

The feeding unit 58 has a function of supplying a laser gas into the receptacle 12 in cooperation with the feed device 22. In a feeding process, for example, the feeding unit 58 starts the feed device 22 to open a feed valve (not illustrated) in response to a signal from the determining unit 56 of the controlling device 30.

The exhausting unit 60 has a function of discharging the gas from the receptacle 12 to the outside in cooperation with the exhaust device 20. In an exhausting process, for example, the exhausting unit 60 starts the exhaust device 20 to open an exhaust valve (not illustrated) in response to a signal from the determining unit 56 of the controlling device 30.

The determining unit 56 may be configured to determine an execution mode of the exhausting process in accordance with the result of a comparison by the comparing unit 54. For example, the determining unit 56 may be configured to determine a target pressure value in the exhausting process. In this case, the exhausting process by the exhaust device 20 is continued until the pressure inside the receptacle 12 detected by the pressure sensor 40 reaches the target pressure value.

The determining unit 56 may also be configured to determine the number of exhaust operations to be carried out in accordance with the result of a comparison by the comparing unit 54. The determining unit 56 may also be configured to determine the duration of an exhaust operation in accordance with the result of a comparison by the comparing unit 54. In other words, the exhausting process may be executed continuously until the predetermined target pressure value is attained, or the exhausting process may be executed multiple times for predetermined exhaust duration.

The determining unit 56 may also be configured to select a certain target pressure value, a certain number of exhaust operations to be carried out, and certain duration of an exhaust operation, among a plurality of target pressure values, a plurality of numbers of exhaust operations, and a plurality of durations of an exhaust operation that are set in advance, in accordance with the result of a comparison by the comparing unit 54.

Figure 3A:
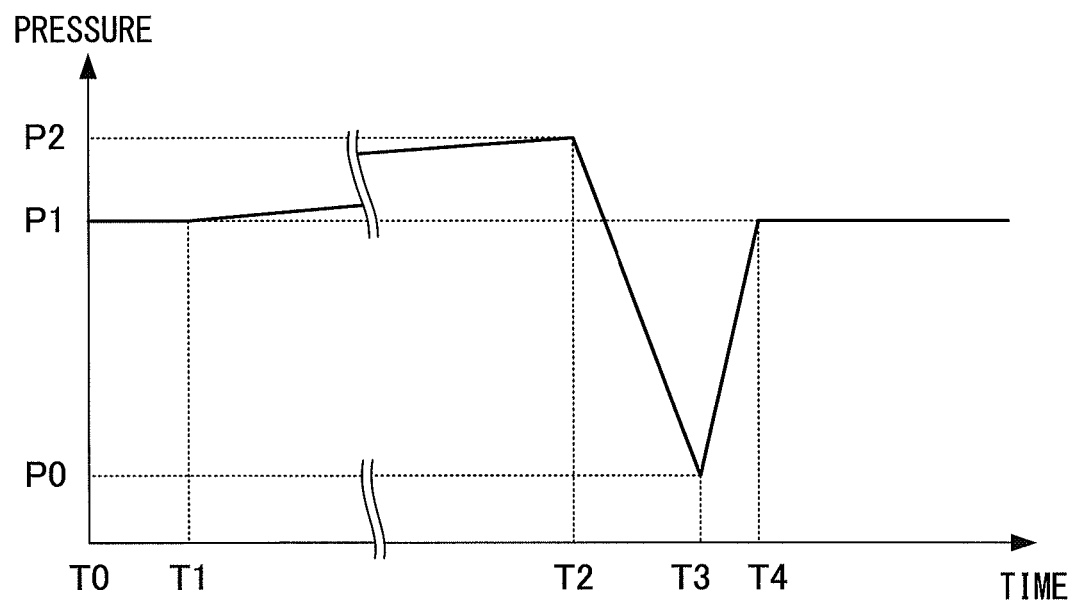
FIG. 3A is a graph for explaining a startup process of starting the gas laser apparatus illustrated in FIG. 1.
Figure 3B:
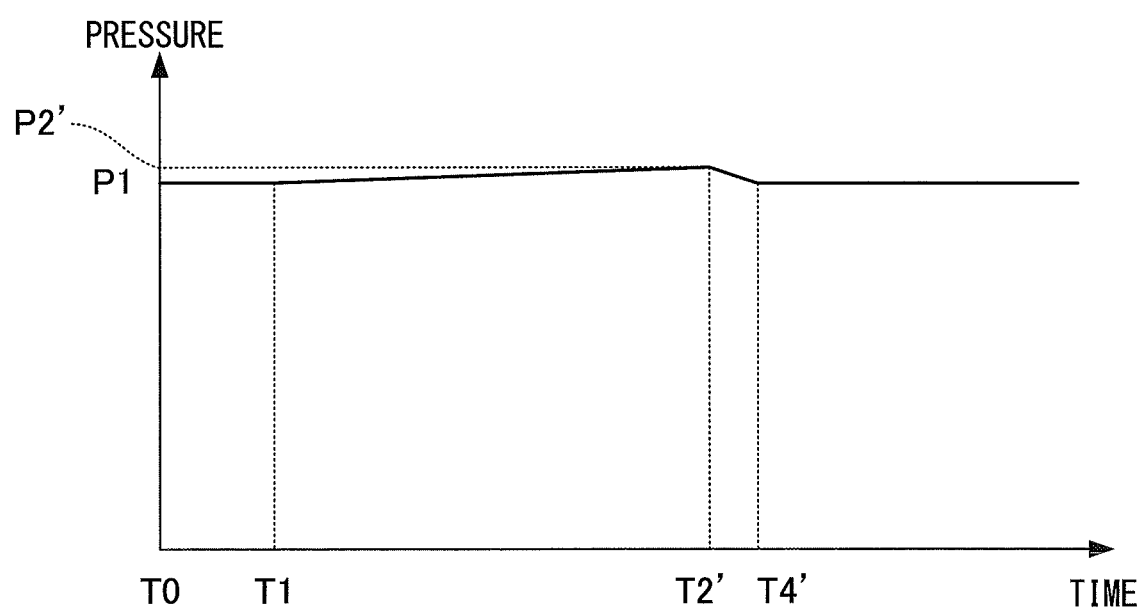
FIG. 3B is a graph for explaining a startup process of starting the gas laser apparatus illustrated in FIG. 1.

FIG. 3A and FIG. 3B are graphs for explaining a startup process of starting the gas laser apparatus 10 according to the present embodiment. The graph illustrated in FIG. 3A corresponds to the case in which the determining unit 56 has determined that the laser gas needs to be replaced. On the other hand, the graph illustrated in FIG. 3B corresponds to the case in which the determining unit 56 has determined that the laser gas does not need to be replaced. The horizontal axes in FIG. 3A and FIG. 3B indicate the elapsed time, and the vertical axes indicate changes in the pressure of the gas inside the receptacle 12.

In the example illustrated in FIG. 3A, the gas laser apparatus 10 is in a normal operation state at time T0 and is emitting a laser beam. Therefore, pressure P1 at time T0 indicates the pressure inside the receptacle 12 during laser emission. Pressure P1, for example, is pressure that is optimum for emitting a laser beam. The gas laser apparatus 10 then stops suddenly at time T1. The sudden stoppage of the gas laser apparatus 10 may occur due to the power supply being shut off unexpectedly. The sudden stoppage of the gas laser apparatus 10 is caused by, for example, power failure or an operational error.

Time T2 represents a time at which the startup process of the gas laser apparatus 10 is started after the gas laser apparatus 10 has stopped suddenly. Although the respective valves, such as the exhaust valve and the feed valve, are closed while the gas laser apparatus 10 is stopped, an amount of a surrounding atmospheric gas that enters the receptacle 12 of the gas laser apparatus 10 increases gradually, as the time elapsed from time T1 to time T2, i.e., the duration in which the gas laser apparatus 10 is stopped, increases. Therefore, as illustrated in FIG. 3A, the pressure inside the receptacle 12 gradually increases over the period from time T1 to time T2, and the pressure inside the receptacle 12 reaches P2 at time T2 (P2>P1).

As described above, the comparing unit 54 of the controlling device 30 calculates a pressure difference ($\Delta P = P2 - P1$) between the pressure P1 at the time of a sudden stoppage and the pressure P2 at the time of restart. The determining unit 56 then compares the pressure difference $\Delta P$ obtained by the comparing unit 54 with a predetermined threshold value.

In the case of the example illustrated in FIG. 3A, the gas laser apparatus 10 is stopped for a long period of time, and the pressure difference $\Delta P$ exceeds the threshold value. Therefore, the determining unit 56 determines that the laser gas needs to be replaced. In the present embodiment, the exhausting process is executed until the pressure inside the receptacle 12 reaches a predetermined pressure P0 (target pressure value) while the pressure value detected by the pressure sensor 40 is being monitored, i.e., until time T3. In the example illustrated in FIG. 3A, the duration of the exhaust operation determined by the determining unit 56 is longer than the duration from time T2 to time T3. Therefore, the pressure inside the receptacle 12 can be reduced to the target pressure value P0 by carrying out an exhausting process once.

After the exhausting process is completed, the feed device 22 is activated, and a laser gas is supplied into the receptacle 12 until the pressure inside the receptacle 12 is restored to pressure P1 at the time of the sudden stoppage, i.e., until time T4. Therefore, in this case, the time necessary to enter a state in which a laser beam can actually be emitted after the startup process begins corresponds to the time elapsed from time T2 to time T4. The determining unit 56 may also have a function of determining the duration of a feed operation and the number of feed operations to be carried out during the feeding process.

Unlike the example illustrated in FIG. 3A, in the example illustrated in FIG. 3B, the startup process is started in a relatively short period of time after the gas laser apparatus 10 has stopped suddenly. In other words, the time elapsed from time T1 to time T2' at which the startup process is started is relatively short. Therefore, pressure P2' inside the receptacle 12 at time T2' does not differ significantly from pressure P1 at the time of the sudden stoppage. Therefore, in this case, the determining unit 56 of the controlling device 30 determines that the laser gas does not need to be replaced.

When the laser gas does not need to be replaced, according to the present embodiment, at least one of the exhausting process and the feeding process is executed, and the pressure inside the receptacle 12 is adjusted so as to match pressure P1 at the time of the sudden stoppage. Then, the startup process is completed at time T4' at which the pressure inside the receptacle 12 reaches pressure P1 again, and the gas laser apparatus 10 becomes a state in which a laser beam can be emitted. Therefore, in this case, the time elapsed from time T2' to time T4' corresponds to the time necessary for the startup process. As can be seen from the comparison with the example illustrated in FIG. 3A, the time necessary for the startup process can be reduced significantly. In addition, as compared with the case in which the laser gas is replaced, the amount of a laser gas discharged from the receptacle 12 can be reduced to a minimum, and the amount of consumed laser gas can thus be reduced.

In the case where the time necessary to start the startup process after sudden stoppage is extremely short and it can be regarded that pressure P2' at the time of the startup has not changed from pressure P1 at the time of the sudden stoppage, an adjusting process of adjusting the pressure inside the receptacle 12 may as well be omitted.

Figure 4:
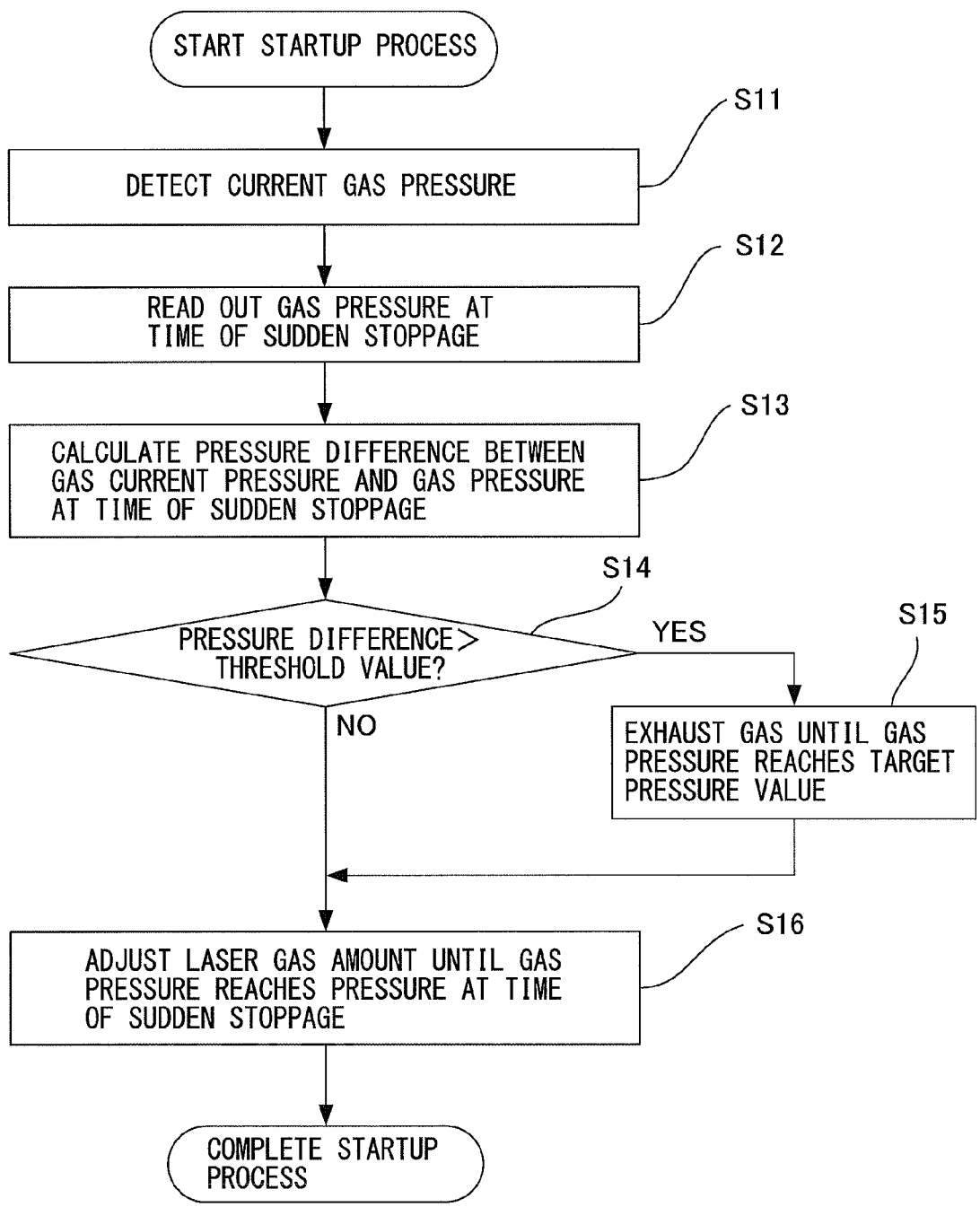
FIG. 4 is a flowchart illustrating a flow of the startup process of starting the gas laser apparatus illustrated in FIG. 1.

FIG. 4 is a flowchart illustrating a flow of the startup process of starting the gas laser apparatus according to the first embodiment. The startup process illustrated in FIG. 4 is executed after the gas laser apparatus 10 has stopped suddenly, as described above with reference to FIG. 3A and FIG. 3B. It is to be noted that flows of the respective processes are described by way of example with reference to flowcharts in the present specification, and the processes do not need to be executed in the order illustrated in the flowcharts or in the order in which the processes are described. Therefore, the terms such as "next" and "then" is used only for convenience and is not intended to limit the present invention.

When the power supply to the gas laser apparatus 10 is restored and the controlling device 30 receives a startup start signal, the pressure of the gas inside the receptacle 12 held at that moment is detected by the pressure detecting unit 50 (step S11). It is preferable that step S11 is executed in the same state as the state in which the gas laser apparatus 10 stopped suddenly. For example, step S11 is executed with the fan 14 in operation.

At step S12, the pressure of the gas inside the receptacle 12 at the time of the sudden stoppage, which has been stored, is read out from the pressure storing unit 52. Then, a pressure difference between the pressure at the time of the startup, which has been obtained at step S11, and the pressure at the time of the sudden stoppage, which has been read out at step S12, is calculated by the comparing unit 54 (step S13). The pressure difference calculated at step S13 is output to the determining unit 56 for comparison with a predetermined threshold value at step S14. When it is determined at step S14 that the pressure difference is greater than the threshold value, i.e., when it is determined that the laser gas needs to be replaced, the process proceeds to step S15. On the other hand, when it is determined that the pressure difference is equal to or less than the threshold value, step S15 is bypassed, and the process proceeds to step S16.

At step S15, as descried above with reference FIG. 3A, the gas inside the receptacle 12 is discharged to the outside by the exhaust device 20 until the pressure of the gas inside the receptacle 12 reaches a predetermined target pressure value (e.g., pressure P0).

At step S16, the amount of the laser gas is adjusted until the pressure of the gas inside the receptacle 12 reaches the pressure (pressure P1 indicated in FIG. 3A and FIG. 3B) at the time of the sudden stoppage. The amount of the laser gas is adjusted by operating the feed device 22 and the exhaust device 20 as necessary. Once the adjustment of the amount of the laser gas is completed, the gas laser apparatus 10 becomes a state in which the laser gas can be excited in the discharge tube 28, and the startup process is thus completed.

Figure 5:
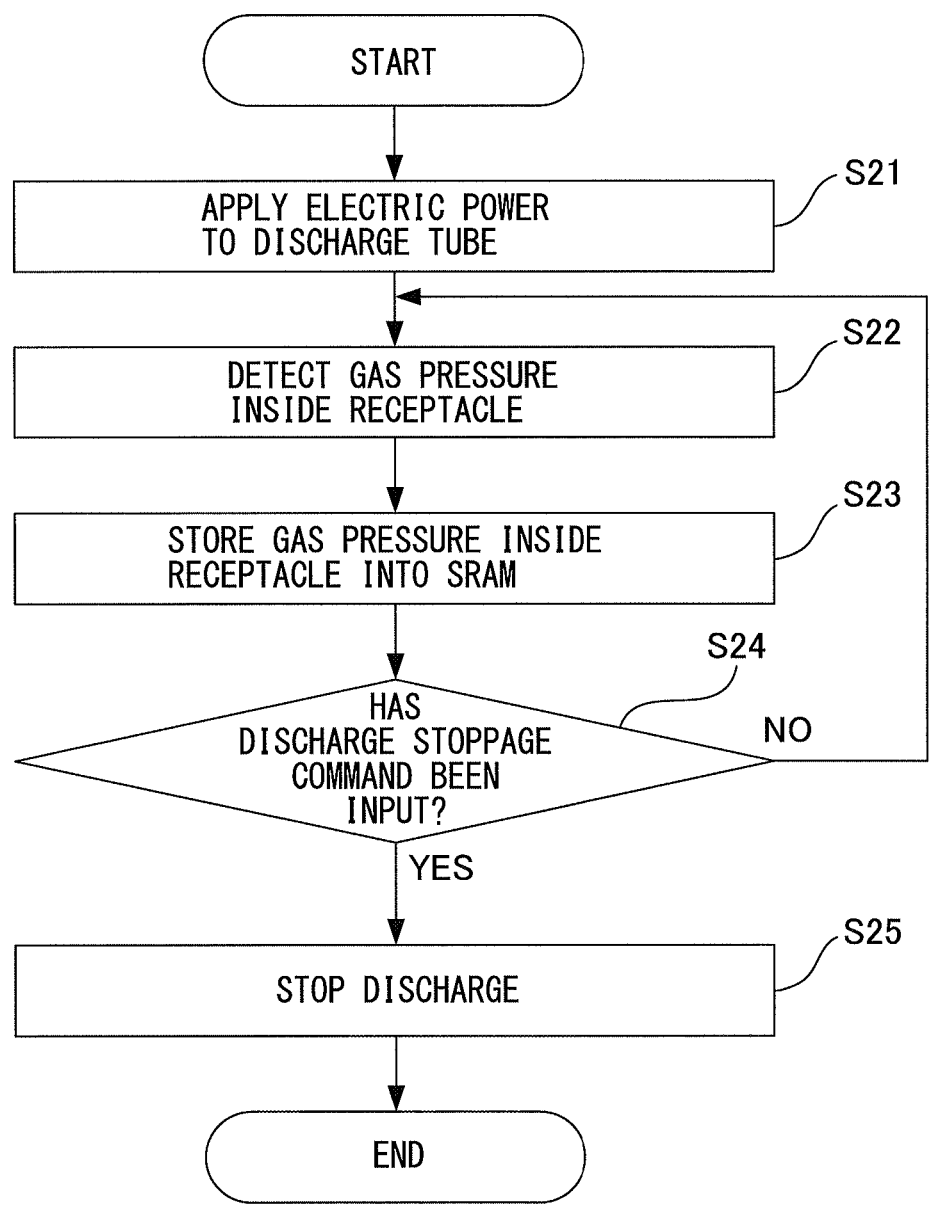
FIG. 5 is a flowchart illustrating a flow of a process performed when a gas pressure at the time of a sudden stoppage is obtained in the gas laser apparatus according to the first embodiment.

FIG. 5 is a flowchart illustrating a flow of a process performed by the gas laser apparatus 10 according to the first embodiment, in order to obtain the gas pressure at the time of the sudden stoppage. The flowchart illustrated in FIG. 5 indicates a process from the beginning of a discharge process to the end. When the discharge process is started, electric power is applied to the discharge tube 28 from the laser power supply 32 (step S21). Then, at step S22, the pressure of the gas inside the receptacle 12 is detected by the pressure detecting unit 50.

The pressure value obtained at step S22 is stored into the non-volatile storage device of the controlling device 30, such as an SRAM having a built-in battery (step S23). Therefore, the pressure value stored at step S23 is retained without being deleted even when the power supply to the controlling device 30 is shut off.

Then, at step S24, it is determined whether or not a discharge stoppage command has been input. The discharge stoppage command is a signal that is input when the use of a laser beam is completed, for example, when laser machining is finished. In the case where the discharge stoppage command has been input, the process then proceeds to step S25, at which the discharge process is terminated, and the gas laser apparatus 10 is stopped. On the other hand, when it is determined at step S24 that the discharge stoppage command is not input, the process returns to step S22, and steps S22 to S24 are repeated. Even when the gas laser apparatus 10 stops suddenly as the power supply to the controlling device 30 is shut off or the like while the above-described processes are repeated, the pressure value stored at step S23 will be retained without being erased.

In this way, according to the present embodiment, the pressure of the gas inside the receptacle 12 is detected periodically while the gas laser apparatus 10 operates normally, and the detected result is stored into the non-volatile storage device. Then, when the gas laser apparatus 10 is restarted, the pressure value detected immediately before the gas laser apparatus 10 has stopped suddenly is used in the comparing process by the comparing unit 54 as described above.

Figure 6:
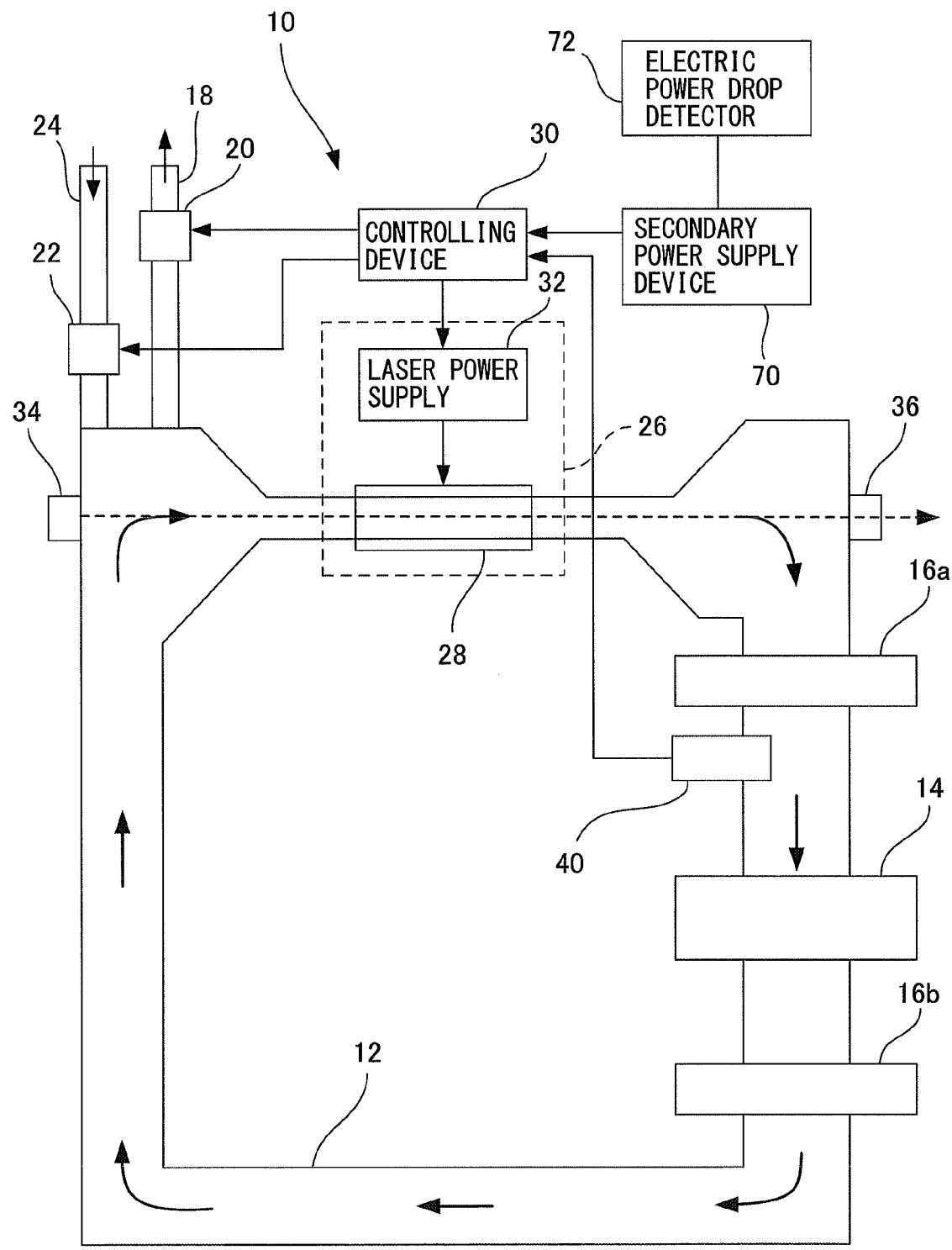
FIG. 6 illustrates a configuration of a gas laser apparatus according to a second embodiment.

FIG. 6 illustrates a configuration of a gas laser apparatus 10 according to a second embodiment. The gas laser apparatus 10 according to the present embodiment includes, in addition to the configuration described above in association with the first embodiment, a secondary power supply device 70 and an electric power drop detector 72. The secondary power supply device 70 has a function of supplying back-up electric power to the controlling device 30 when a primary power supply (not illustrated) that supplies main electric power to be used in a normal operation of the gas laser apparatus 10 is shut off due to power failure, an operational error, or the like. The secondary power supply device 70 is, for example, a power storage device of any known type.

The electric power drop detector 72 has a function of detecting a drop in the electric power applied to the gas laser apparatus 10 and can thus detect that the primary power supply has been shut off. The electric power drop detector 72 is configured to detect a drop in the main electric power on the basis of at least one of electric power, electric current, and voltage supplied from the primary power supply. "On the basis of at least one of electric power, electric current, and voltage" should be interpreted to include not only a case in which a detection value of electric power, electric current, or voltage is used directly, but also a case in which a given parameter derived from such a detection value is used.

FIG. 7 is a flowchart illustrating a flow of a process performed when the gas pressure at the time of the sudden stoppage is obtained in the gas laser apparatus 10 according to the second embodiment. The flowchart illustrated in FIG. 7 indicates a process from a time when the electric discharge process is started to a time when the pressure of the gas inside the receptacle 12 at the time of the sudden stoppage is detected immediately after the gas laser apparatus 10 is stopped suddenly. When the electric discharge process is started, electric power is applied to the discharge tube 28 from the laser power supply 32 (step S31). Then, at step S32, it is determined whether or not the electric power drop detector 72 has detected a drop in the electric power supplied to the gas laser apparatus 10.

When it is determined at step S32 that no drop in the electric power is detected, the electric discharge process is continued. On the other hand, if a drop in the electric power is detected, the process proceeds to step S33, and the gas laser apparatus 10 is stopped quickly.

Then, at step S34, the secondary power supply device 70 is activated so as to switch to the secondary power supply, and electric power is supplied to the controlling device 30 from the secondary power supply device 70. Next, at step S35, the pressure detecting unit 50 of the controlling device 30 detects the pressure of the gas inside the receptacle 12. The pressure value obtained at step S35 is stored, as a pressure value at the time of the sudden stoppage, into the non-volatile storage device of the controlling device 30 at step S36. The gas pressure at the time of the sudden stoppage stored at step S36 is used for comparison with the gas pressure at the time of the startup thereafter in the comparing unit 54.

In this way, according to the present embodiment, by using the secondary power supply device 70, the pressure of the gas inside the receptacle 12 is detected immediately after the sudden stoppage of the gas laser apparatus 10 is caused, and the obtained detection value is stored into the non-volatile storage device. Accordingly, the pressure of the gas inside the receptacle 12 does not need to be detected and stored into the non-volatile storage device periodically, and thus a processing load of the controlling device 30 can be reduced.

Effect of the Invention

According to a gas laser apparatus having the above-described configuration in accordance with the content of the disclosure of the present application, pressure stored when the gas laser apparatus stops suddenly is compared with pressure detected when the gas laser apparatus is started thereafter, and it is determined whether or not a replacing process of a laser gas is to be executed in accordance with the result of the comparison. Since the replacing process of the laser gas is executed as necessary, the startup time of the gas laser apparatus can be reduced. In addition, the amount of consumed laser gas can be reduced, and the running cost of the gas laser apparatus can be reduced.

Although the various embodiments and modifications of the present invention have been described above, it is apparent to a person skilled in the art that functions and effects intended by the present invention can be obtained through other embodiments and modifications. In particular, constituent elements of the embodiments and the modifications described above can be removed or replaced, or a known element can further be added thereto, without departing from the scope of the present invention. In addition, it is apparent to a person skilled in the art that the present invention can be implemented by any combination of the features of the embodiments disclosed implicitly or explicitly in the present specification.

What is claimed is:

1. A gas laser apparatus comprising:
   a receptacle in which a laser gas is enclosed;
   a laser oscillator configured to emit a laser beam with a laser gas serving as an excitation medium;
   a pressure detecting unit configured to detect pressure of a gas inside the receptacle;
   an exhausting unit configured to discharge a gas from the receptacle;
   a feeding unit configured to supply a laser gas into the receptacle;
   a pressure storing unit configured to store the pressure detected by the pressure detecting unit and retain stored information even when a power supply is shut off;
   a comparing unit configured to compare pressure of a gas inside the receptacle which is obtained when the gas laser apparatus has stopped suddenly and is stored by the pressure storing unit, with pressure of a gas inside the receptacle which is detected by the pressure detecting unit and obtained when the gas laser apparatus is restarted after a sudden stoppage; and
   a determining unit configured to determine whether or not a gas should be discharged from the receptacle and whether or not the laser gas should be supplied into the receptacle based on a result of a comparison by the comparing unit.

2. The gas laser apparatus according to claim 1, wherein the determining unit is configured to determine how an exhausting process of discharging a gas from the receptacle is carried out based on the result of a comparison by the comparing unit.

3. The gas laser apparatus according to claim 2, wherein the determining unit is configured to determine at least one of a target pressure value of a laser gas inside the receptacle in the exhausting process, the number of exhaust operations to be carried out, and duration of an exhaust operation.

4. The gas laser apparatus according to claim 1, wherein the pressure storing unit is configured to periodically store pressure of a gas inside the receptacle.

5. The gas laser apparatus according to claim 1, further comprising:
   a secondary power supply device configured to supply back-up electric power to the pressure detecting unit when main electric power supplied to the gas laser apparatus is shut off,
   wherein the pressure detecting unit is configured to detect pressure of a gas inside the receptacle immediately after the main electric power is shut off.

6. The gas laser apparatus according to claim 5, further comprising:
   an electric power drop detector configured to detect a drop in the main electric power,
   wherein the electric power drop detector is configured to detect that the main electric power has been shut off on the basis of at least one of electric power, an electric current, and a voltage supplied to the gas laser apparatus.

7. The gas laser apparatus according to claim 6, wherein the pressure storing unit is configured to store pressure of a gas inside the receptacle detected by the pressure detecting unit immediately after the electric power drop detector detects that the main electric power has been shut off.

* * * * *